United States Patent
Hayes et al.

(10) Patent No.: US 6,582,073 B1
(45) Date of Patent: Jun. 24, 2003

(54) VISUAL FIELD OCCLUDER TO BE USED IN CONJUNCTION WITH EYEGLASSES

(75) Inventors: Doris Jean Hayes, Chuckey, TN (US); James Lonnie Hayes, Chuckey, TN (US); Tamara Jeanine Cross, Chuckey, TN (US)

(73) Assignee: Doris Hayes, Chuckey, TN (US)

(*) Notice: Subject to any disclaimer, the term of this patent is extended or adjusted under 35 U.S.C. 154(b) by 0 days.

(21) Appl. No.: 10/102,454

(22) Filed: Mar. 20, 2002

(51) Int. Cl.[7] ................................................. G02C 7/16
(52) U.S. Cl. ................................ 351/45; 351/158; 2/13
(58) Field of Search ............................. 351/44, 45, 46, 351/158; 2/15, 12, 13

(56) References Cited

U.S. PATENT DOCUMENTS

| | | | | |
|---|---|---|---|---|
| 1,706,682 A | * | 3/1929 | Takacs | 2/13 |
| 2,106,615 A | * | 1/1938 | Maurer | 2/12 |
| 2,671,898 A | * | 3/1954 | Wade | 2/15 |
| 4,582,401 A | * | 4/1986 | Grindle | 351/45 |

* cited by examiner

*Primary Examiner*—Huy Mai

(57) ABSTRACT

A visual corrective device is provided in the form of a visual field occluder for use with a pair of eyeglasses having a frame formed with an inside bridge joining lens frame portions in which the lenses are seated, a separately attached nose pad, and outside bows, earpieces, on either side for supporting the pair of eyeglasses. The large end of the patch has a slit, which will allow the patch to slide over the nose pad. The small end has a puncture (+) which allows the patch to slide over the earpiece and adjust to fit against the face. The visual field occluder, because of symmetrical design, may be fitted on either the right or left side of a pair of eyeglasses. The field of view of the stronger eye will be occluded by the patch thereby constraining the wearer to exercise greater use of the weaker eye through the field of view of the unoccluded eye.

2 Claims, 1 Drawing Sheet

VISUAL FIELD OCCLUDER TO BE USED IN CONJUNCTION WITH EYEGLASSES

CROSS-REFERENCE TO RELATED APPLICATIONS OR DEVELOPMENT

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to a new corrective visual device, which while being worn in conjunction with eyeglasses, blocks the field of view of one eye thereby constraining the wearer to exercise greater use of the uncovered eye. This invention is particularly useful in the treatment of strabismus, and similar problems of unbalanced eye musculature by discouraging use of the stronger eye whose visual field is blocked and promoting use and exercise of the muscles of the weaker eye with a clear field of view through the uncovered eye. This invention is also useful when there is a need to conceal the eye because of surgery, injury, etc.

Problems of unbalanced eye musculature and related defects are presently treated in young children by securing an adhesive patch over the stronger eye to promote use and exercise the muscles of the weaker eye. The adhesive patch is extremely irritating for many children, and there is a tendency for the child to pull on the patch and remove the patch.

U.S. Pat. No. 893,972 for an eye guard and shield for spectacles, U.S. Pat. No. 2,172,573 for an eyeshield, and U.S. Pat. No. 2,895,376 for occluders for spectacle attachment, come directly in contact with either or both the lens and lens frame of the eyeglasses. U.S. Pat. No. 4,582,401 for visual field and lens occluder for eyeglasses only covers the lens of the eyeglasses, which would allow the child to look around the patch.

BRIEF SUMMARY OF THE INVENTION

An object of this invention is to provide a new visual field occluder, which effectively treats unbalanced eye musculature without adhesive contact with the child's face, yet eliminating the child seeing around the patch.

Another object of this invention is to improve the wear time of the corrective device, thereby possibly reducing the overall time of wearing the corrective device. Since the device is attached to the eyeglasses, and not the skin, the child will wear the patch at all times he or she is wearing their eyeglasses, unlike the adhesive patch which is easy to procrastinate applying because of the irritation.

A further object of this invention is to provide a corrective device, which can be used on either eye, is easy to clean, and is reusable, thereby making it more economical than the adhesive type.

An additional object of this invention is to make it fun for the child to wear the patch by offering different colors and designs.

DETAILED DESCRIPTION OF THE INVENTION

Figure 1:
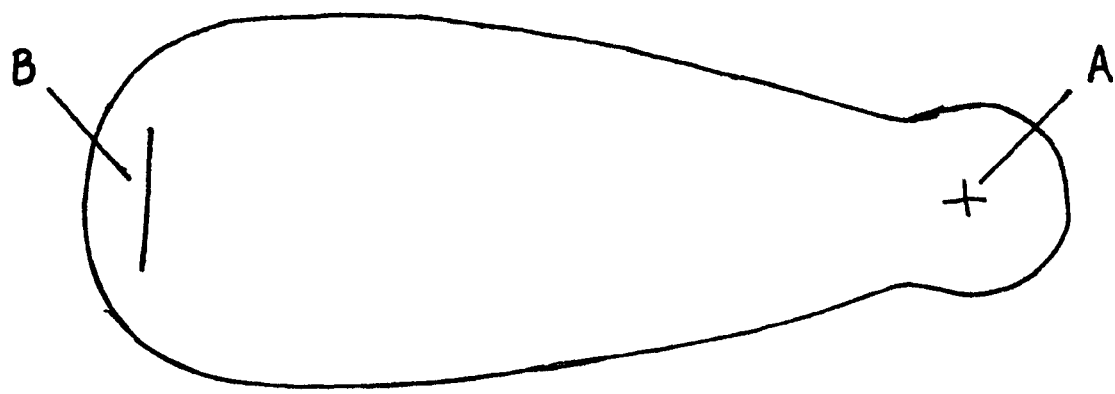
FIG. 1 indicates the shape of the patch. There is a small perforation (A) in the small round end, which will slide over the outside bow, earpiece, of the eyeglasses. There is a slit in the large end (B), which will slip over the nose pad of the eyeglasses.
Figure 2:
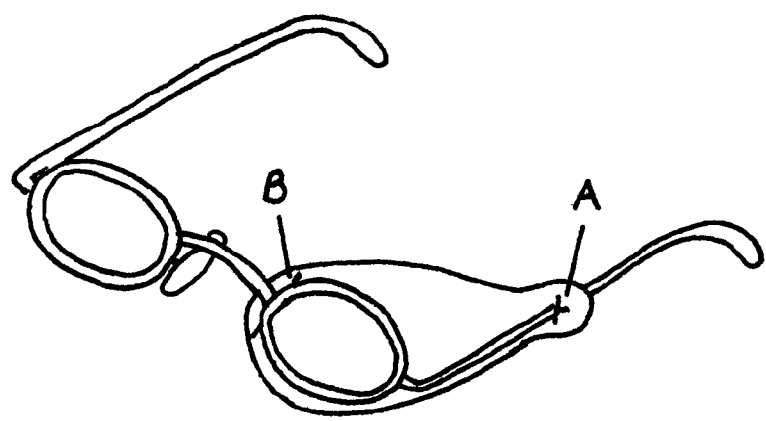
FIG. 2 is a perspective view of a pair of eyeglasses showing the visual field occluder in place according to the invention.

In the preferred embodiment of the present invention illustrated in FIGS. 1 and 2, the visual field occluder is constructed from 2 mm thick foam. A perforation in the shape of (+) is made in the small end of the patch making it possible to slide the patch over the ear piece of the eyeglasses and then adjusted to cause the patch to fit against the face without adhesive. A slit approximately 1 cm long is made in the large end. This slit enables the patch to be attached over the nose pad of the eyeglasses.

The visual field occluder would normally be used according to a schedule recommended by the child's ophthalmologist. This invention provides a healthful and safe visual field occluder which when used with a pair of eyeglasses permits light and air to enter around the sides maintaining a healthful environment for the child's eye while achieving the desired result of completely blocking the field of vision in the strong eye thereby promoting use of the weaker eye. There is no irritating adhesive contact with the skin.

While the invention has been described with reference to the particular preferred example, it is intended to cover all variations and equivalents within the scope of the following claims.

We claim:

1. A visual field occluder for treatment of strabismus and similar problems of unbalance eye musculature by blocking field view of the stronger eye and promoting use and exercise of the eye muscles of the weaker eye, said occluder being used with a pair of eyeglasses having a frame formed with an inside bridge joining lens frame portions in which the lenses are seated, a nose pad is attached separately, and outside bows on either side for supporting the pair of eyeglasses, comprising:

a visual field patch constructed from a 2 mm thick piece of foam, arranged for blocking the field of view of one eye without irritating contact with the skin of a wearer, said patch being constructed symmetrically with a slit in the large end of the patch for slipping over the nose pad, and a puncture (+) in the small end for sliding over the outside bow, whereby said patch may be fitted over either the right or left side of the eyeglasses, said puncture enabling the patch to be adjusted to fit against the side of a wearer's face without irritating adhesive.

2. The visual field occluder as claimed in claim 1, wherein the patch can be used for concealing the eye while recovering from surgery or injury of the eye.

* * * * *